US008349114B2

(12) United States Patent
Green

(10) Patent No.: US 8,349,114 B2
(45) Date of Patent: Jan. 8, 2013

(54) MUG WRAP

(76) Inventor: Cary Green, Skokie, IL (US)

( * ) Notice: Subject to any disclaimer, the term of this patent is extended or adjusted under 35 U.S.C. 154(b) by 1035 days.

(21) Appl. No.: 11/363,551

(22) Filed: Feb. 27, 2006

(65) Prior Publication Data
US 2006/0283555 A1 Dec. 21, 2006

Related U.S. Application Data

(60) Provisional application No. 60/657,331, filed on Feb. 28, 2005.

(51) Int. Cl.
B29D 22/00 (2006.01)
B32B 37/14 (2006.01)
B32B 38/14 (2006.01)
B32B 38/10 (2006.01)
B32B 37/10 (2006.01)
B41M 5/03 (2006.01)
B41M 5/035 (2006.01)
B21J 13/04 (2006.01)
B32B 38/06 (2006.01)

(52) U.S. Cl. ........ 156/213; 156/229; 156/230; 156/232; 156/240; 428/32.6; 72/460; 503/227

(58) Field of Classification Search .................. 156/240, 156/213, 229, 230, 232; 428/32.6; 72/460; 503/227
See application file for complete search history.

(56) References Cited

U.S. PATENT DOCUMENTS

| 76,345 | A | * | 4/1868 | Purdy | 100/212 |
|---|---|---|---|---|---|
| 3,151,632 | A | * | 10/1964 | Risley et al. | 138/99 |
| 3,816,221 | A | * | 6/1974 | Shank, Jr. | 156/492 |
| 4,217,990 | A | * | 8/1980 | Ripley | 217/95 |
| 4,237,174 | A | * | 12/1980 | Lagardere et al. | 428/99 |
| 4,384,906 | A | * | 5/1983 | Molinari et al. | 156/86 |
| 4,409,708 | A | * | 10/1983 | Hauffe | 24/279 |
| 4,420,262 | A | * | 12/1983 | Sterrenberg | 366/110 |
| 4,658,721 | A | * | 4/1987 | Mathis | 101/9 |
| 4,680,067 | A | * | 7/1987 | Moore | 156/165 |
| 4,689,858 | A | * | 9/1987 | Barber | 24/17 B |
| 4,713,129 | A | * | 12/1987 | Inhofe et al. | 156/71 |
| 4,762,064 | A | * | 8/1988 | Moore | 101/150 |
| 4,874,454 | A | * | 10/1989 | Talalay et al. | 156/359 |
| 4,954,213 | A | * | 9/1990 | Jos et al. | 156/49 |
| 4,989,508 | A | * | 2/1991 | King | 101/35 |
| 5,019,193 | A | * | 5/1991 | Aramini | 156/64 |
| 5,244,529 | A | * | 9/1993 | Siegel | 156/384 |
| 5,296,081 | A | * | 3/1994 | Morin et al. | 156/498 |
| 5,318,942 | A | * | 6/1994 | Laudy | 503/227 |
| 5,382,313 | A | | 1/1995 | Eminger | |

(Continued)

Primary Examiner — Sonya Mazumdar
(74) Attorney, Agent, or Firm — Friedman & Friedman, Ltd.; Eugene F. Friedman

(57) ABSTRACT

A strelchable wrap for holding a sheet with sublimable ink against an object, such as a mug, for transferring an image from the sheet to the mug. The wrap has two layers of elastomeric, rubber material glued together. The inner layer has a greater sponginess to conform the sheet to the mug, while the outer layer has greater strength to stretch and hold the web over the sheet. Flexible rods, held at the ends of the rubber sheet by the outer layer glued to itself, attach the web with the sheet to the mug. The rods connect together above and below the mug and hold the rubber web in a stretched condition with the inked sheet in contact with the mug. The rods also extend above and below the rubber web which, in turn, is wider than the mug. Connecting together the ends of the connector rods permits their joinder.

12 Claims, 6 Drawing Sheets

U.S. PATENT DOCUMENTS

| | | | |
|---|---|---|---|
| 5,395,478 A * | 3/1995 | Sattler et al. | 156/481 |
| 5,584,961 A * | 12/1996 | Ellsworth et al. | 156/481 |
| 5,630,894 A * | 5/1997 | Koch et al. | 156/64 |
| 5,711,837 A | 1/1998 | Kantrowitz | |
| 5,733,614 A * | 3/1998 | Stieb | 428/34.9 |
| 5,755,921 A * | 5/1998 | Christensen | 156/391 |
| 5,802,969 A * | 9/1998 | Wess et al. | 101/9 |
| 5,876,547 A * | 3/1999 | Kiesow et al. | 156/215 |
| 5,944,931 A * | 8/1999 | Cranford | 156/230 |
| 5,948,728 A * | 9/1999 | Patton et al. | 503/227 |
| 5,997,678 A * | 12/1999 | Wess et al. | 156/240 |
| 6,186,207 B1 | 2/2001 | Berghauser et al. | |
| 6,230,774 B1 | 5/2001 | Ward | |
| 6,316,751 B1 * | 11/2001 | Wyke et al. | 219/535 |
| 6,588,070 B2 * | 7/2003 | Tran | 24/279 |
| 6,624,118 B2 | 9/2003 | Tang et al. | |
| 6,699,352 B2 | 3/2004 | Sawatsky | |
| D557,717 S * | 12/2007 | Chen | D15/144 |
| 7,329,631 B1 * | 2/2008 | Burnett | 503/227 |
| 8,002,931 B2 * | 8/2011 | Wang et al. | 156/240 |
| 2004/0124130 A1 * | 7/2004 | Walker, Jr. | 210/232 |
| 2007/0209763 A1 * | 9/2007 | Chen | 156/583.1 |

* cited by examiner

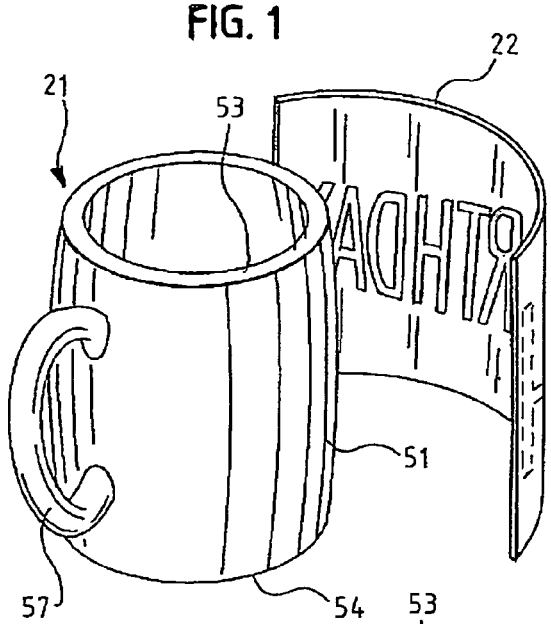
FIG. 1
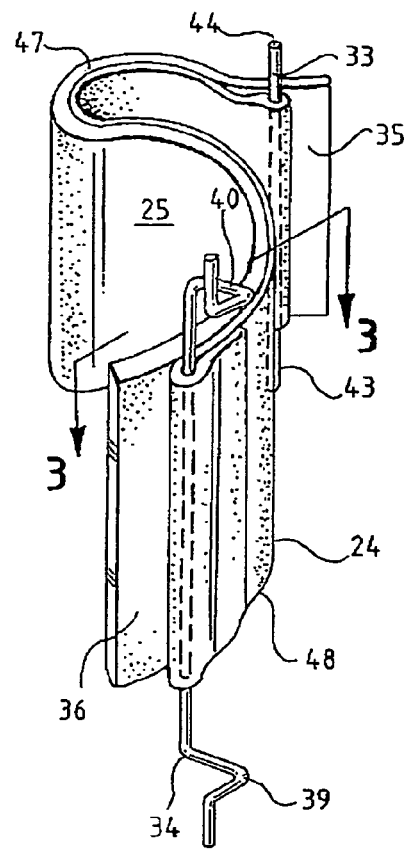
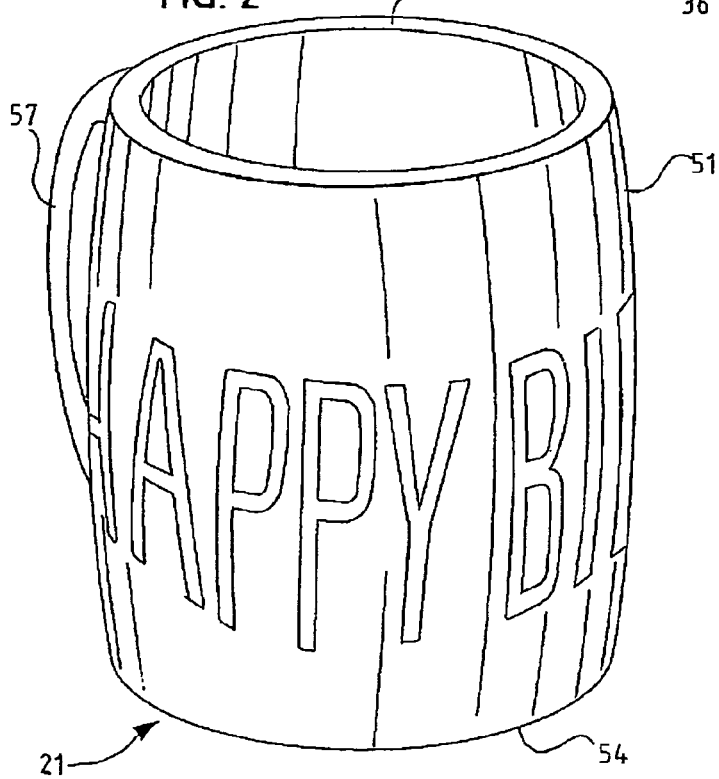
FIG. 2
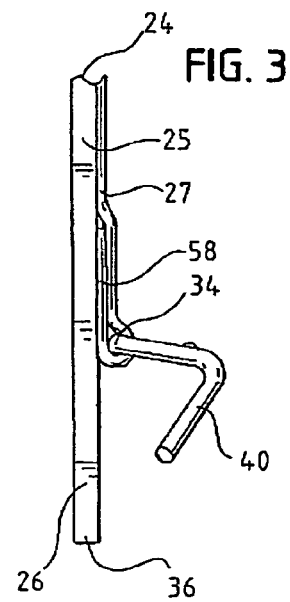
FIG. 3

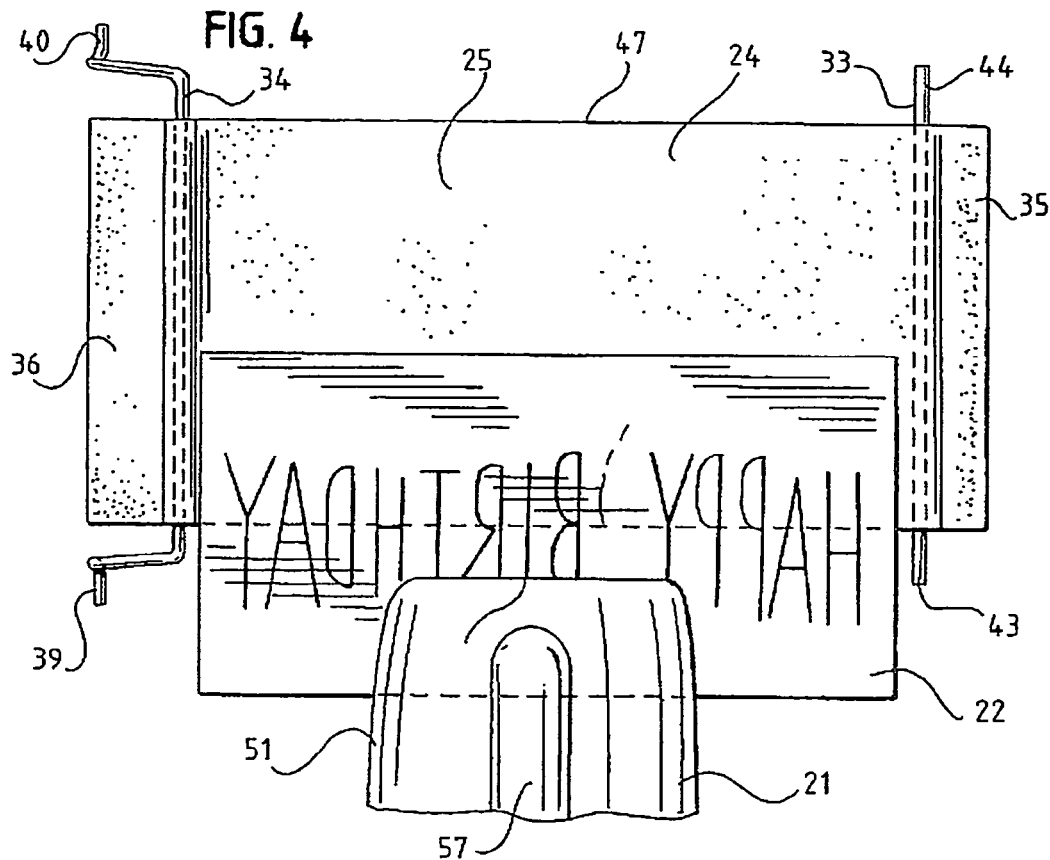
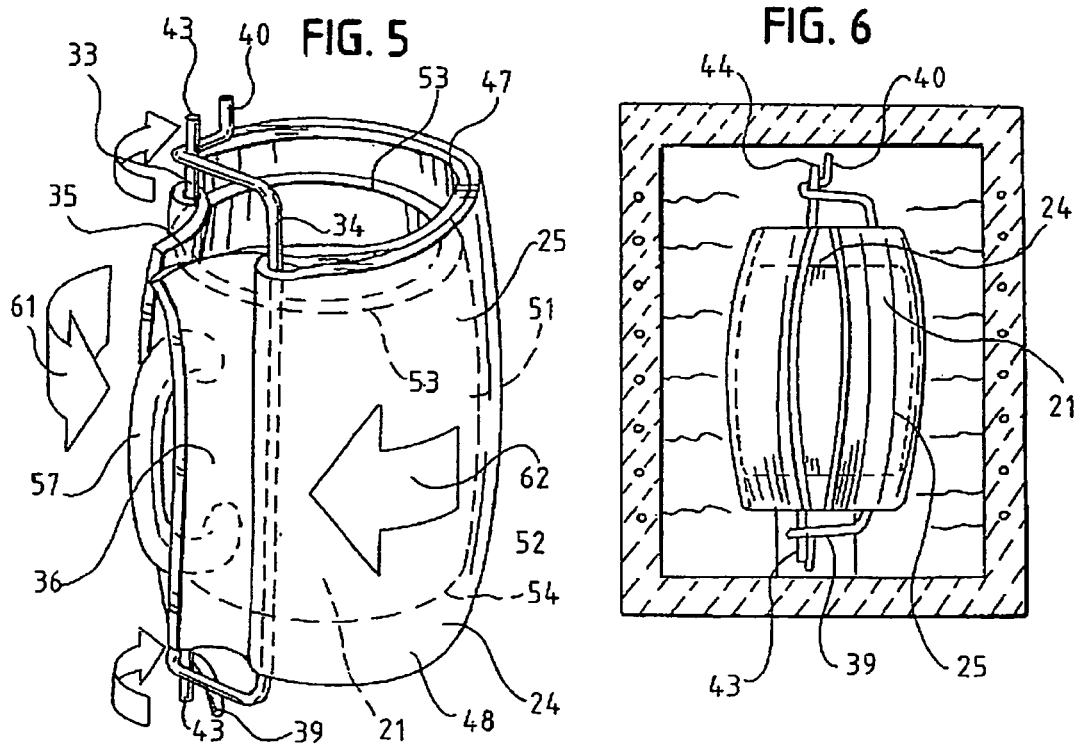

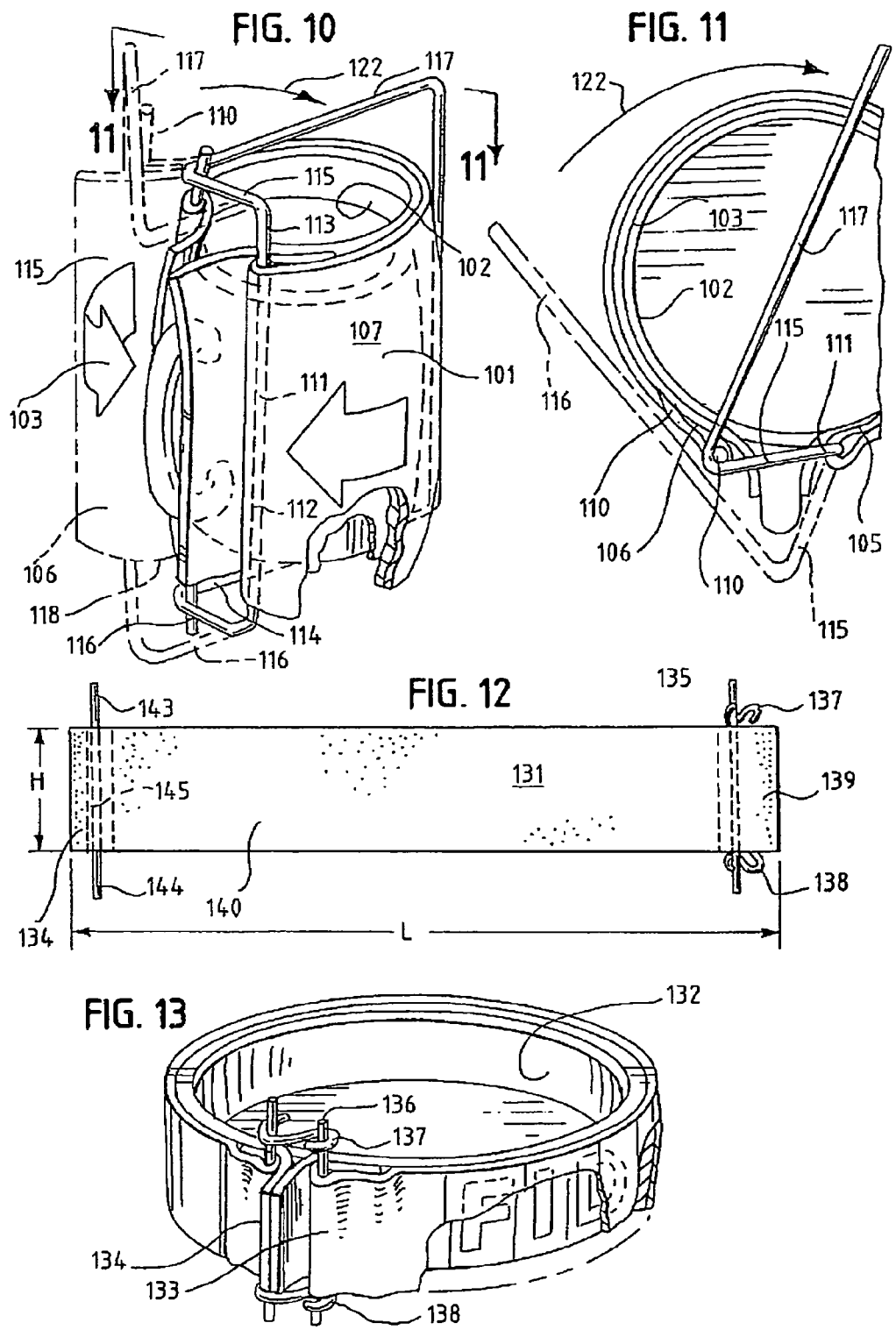

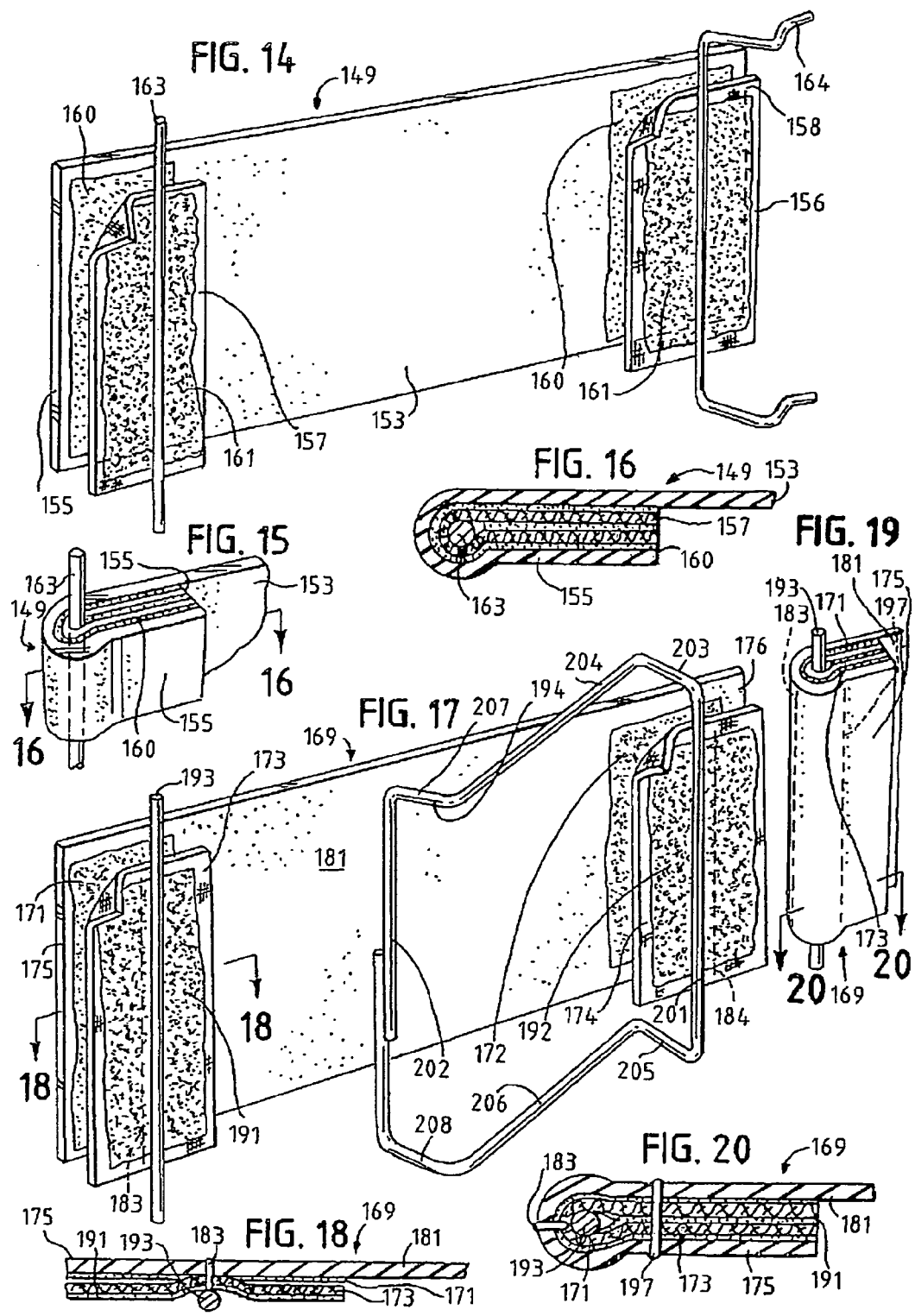

MUG WRAP

CROSS REFERENCE TO RELATED APPLICATION

The present application claims the benefit of the filing of the U.S. provisional patent application Ser. No. 60/657,331 filed on Feb. 28, 2005.

BACKGROUND

Heat-transfer printing including sublimation printing has provided a significant advance to the art of decorating objects such as mugs and tiles with desired pictures, verbiage, and other memorable images. The process allows the user to employ the usual computer programs to create the desired material that will appear on the printed article. With such programs, the printed material may range from simple verbiage to very complex drawings or photographs. The latter can include people's likenesses, scenery, or anything else that appears in photographs or drawings. To provide the correct left-right orientation on the final item when desired, the image can undergo a mirror-image reversal prior to printing to create a mirror image of the desired view. The transfer onto the article corrects the reversal.

The actual inks and toners used in sublimation or other heat-transfer processes have received substantial investigation and reporting in recent times. The current technology permits the use of ink or toner in various computer ink-jet and laser printers. This in turn allows the employment of the usual computers and programs as set forth above. Using ink or toner that will actually evaporate off suitable paper, the user then places the image on a piece of that paper. A discussion of one line of sublimation ink finding current use appears in the United States patents of N. Hale, M. Xu, and B. Wagner including, specifically U.S. Pat. Nos. 5,488,907, 5,555,813, 5,590,600, 5,601,023, 5,640,180, 5,642,141, 5,734,396, 5,746,816, 5,830,623, 6,425,331, 6,439,710, 6,488,370, 6,618,066, and 6,686,314. Others may suffice as well.

The image-containing sheet is then placed against the article that will be decorated. This article typically has one of several commercially available, polymer-based coating to accept the subliming ink. The article with the sheet undergoes heating, often to temperatures of about 450 degrees F. Under the action of this heat, the inks or toners transfer from the sheet to the article.

Holding the sheet with the image in intimate contact with the mug or other article has always proven difficult if not worse. Typically, a "wrap" of some material, such as an elastomer, or rubber, encircles the article that will receive the image. The wrap holds the image-containing sheet between it and the article.

However, a wrap of this type poses several problems. The first difficulty concerns attaching tightly the ends of the wrap around the article. Typically, the wrap has metal ends and uses screws and nuts to attach them together at the article's center between its top and bottom edges. This activity often makes use of an electric screwdriver or drill to facilely accomplish it. When employing more than one screw, two or more fasteners must receive correct adjustments in order to assure a uniform fit and pressure against the image sheet and the article. The elastic wrap may also not assure a tight fit of the transfer sheet against the article. Lastly, a wrap of this sort has severe difficulty adjusting to articles with curving or nonparallel sides, often resulting in incomplete image transfer especially at the top and bottom edges. Holding the wrap onto sloping or conical articles often proves difficult if not impossible.

R. K. Laudy, in his U.S. Pat. No. 5,318,942, shows an elastic wrap for what he calls, "sublistatic" printing. His wrap utilizes rigid metal ends on the elastic band. He then uses what appears to be an ordinary, large paper clamp, to hold the two metal ends together. Unfortunately, the effectiveness of the wrap depends upon the holding power of the clamp keeping the two ends together. Further, the clamp has to fit correctly over the particular mug's handle or else the web cannot find use. Curved or sloping sides of the mug would also appear to present very difficult, if not insurmountable, problems for this wrap. Accordingly, the search and need continues for a web easily used in a wide variety of circumstances.

SUMMARY

Holding the two ends of the web with a greater force at the edges rather than at its center will provide numerous advantages not previously seen. It avoids the problem of a clamp fitting correctly over an article's handle. It can accommodate curved or even sloping sides. Essentially such a wrap will hold a sheet with a transferable image against an article having upper and lower edges for transferring an image from the sheet to the article. The wrap will include, first an elastomeric, flexible web of material having first and second ends, a top and a bottom. The top and bottom extend between the first and second ends.

A connector couples to the web in proximity to the first and second ends. The connector will releasably hold the first and second ends towards each other with the top of the web towards the article's upper edge and the bottom of the web towards the lower edge and with the web forcing the sheet toward the article and the sheet into contact with the article. In doing so, the connector places the web under an extension force, with the extension force being greater near the article's top and bottom edges than near the center between the article's top and bottom edges.

Alternately, instead of having greater force at its top and bottom, the wrap may make use of an elastomeric web having a construction of two layers of different elastomeric material held together. This will allow one layer to hold the transfer sheet firmly against the mug or other article while the second, typically the outer, layer has greater toughness to provide structural integrity to the web.

Providing a wrap with flexible, as opposed to rigid, ends allows it to conform to the contours and exigencies of a particular mug or other curved article. Such a wrap will include a connector which, when coupled to the web, remains flexible.

In use, the web may experience a substantial stretching. Attaching the connector to the web with mechanical devices like screws or rivets may create weakness in the elastomer which can cause its failure in actual use. Entrapping the connector within the elastomeric web avoids this source of failure. In this instance, the connector will couple to the web in proximity to the first and second ends by a portion of the web being glued to itself.

As a particularly desirable feature, the wrap, when connected to the mug or other article, may actually extend beyond the article's upper and lower edges. This will allow the printing of an image over the entire height of the article. Further, it accommodates articles with curved sides. It proves particularly useful in holding transfer sheets in place on articles with conical sides like shot glasses or with sloping surfaces like various mugs and bowls. This type of wrap will include a connector coupled to the web in proximity to the first and second ends with the top of the web extending towards and beyond the article's upper edge and the bottom of the web extending towards and beyond the article's lower edge.

Alternately or additionally, the connector itself may well extend beyond the upper and lower edges of the article. This permits the coupling and uncoupling of the connector without interference from the article or its handle. This type of wrap will include a connector having a dimension extending substantially perpendicular to the top and bottom of the web, with this dimension being greater than the distance between the upper and lower edges of the article.

As a further consideration, the connector may extend beyond the upper and lower edges of the elastomeric web itself. This permits the placement of an extensive force on the web all the way to its top and bottom. This wrap will then include a connector with a dimension extending substantially perpendicular to the web's top and the bottom. This dimension will be greater than the distance between the top and the bottom of the web, and the connector itself will extend beyond the top and the bottom of the web.

The connector itself may take the form of flexible metal rods on the two ends of the web, with the rods interconnecting. This permits the connector itself to follow the contours of the article receiving the image. When the web extends beyond the article's top and bottom, the flexible rods also allows the connector to cinch the web around the article's top and bottom. This type of connector can include (a) a first flexible metal rod affixed to the web in proximity to the first end, this first rod having first upper and lower ends free from the web; and (b) a second flexible metal rod affixed to the web in proximity to the second end, the second rod having second upper and lower ends free from the web. To permit the connector to affix the web to the article, the first upper end of the first rod is engageable with the second upper end of the second rod while the first lower end is similarly engageable with the second lower end. These engagements will serve to prevent the first and second upper and lower ends from moving beyond first and second predetermined distances, respectively from each other. A particularly useful connector will have an interconnect between the upper and lower end of the first rod to simultaneously move them both into engagement with the ends of the second rod.

With rod connectors as described immediately above, the wrap may make use of an elastomeric web not necessarily composed of two separate layers. In this instance, the wrap also includes sections of fabric adhered at either end of the web and located between the rods and the elastomeric web. Glue and possibly stitching may adhere the fabric to the web. Additional stitching may adhere the ends of the web to itself with the rods encircled.

The web itself may extend further around the article than the location of the connector holding the wrap to the article. This allows for a transfer sheet to extend virtually 360 degrees around an article even when the connector itself has to stop short. Further, it helps to prevent gasses that may develop during sublimation or other heat transferring from moving past the connector and possibly distorting the transferred image. For this type of wrap, the first and second ends of the web will extend beyond the connector towards the second and first ends, respectively.

The wrap, of course, finds use in holding a sheet to an article having upper and lower edges for transferring an image to the article from the sheet. The method of doing so involves first placing the sheet in contact with the article. Then an elastomeric, flexible web of material is placed around the sheet in contact with the article, the web having first and second ends, a top and a bottom, the top and the bottom extending between the first and second ends. Lastly, the first and second ends of the web are releasably held towards each other with the top of the web towards the article's upper edge and the bottom of the web towards the article's lower edge and with the web forcing the sheet toward the article and the sheet into contact with the article. In one aspect, the web ends are held together while placing the web under an extension force, the extension force being greater near the top edge and the bottom edge of the article than near the center between the article's top and bottom edges.

A separate concept utilizes a web including at least two layers of elastomeric material coupled together. This method provides the advantages of a soft layer to hold the sheet in intimate contact with the article yet assures the structural integrity discussed above.

Alternately, the ends of the web may remain flexible while held towards each other. Or, the web ends may be held towards each other with a connector coupled to the web in proximity to the first and second ends by a portion of the web being glued to itself. Providing separate benefits, the method may place around the transfer sheet a web having a top and a bottom where the distance between this top and bottom is greater than the distance between the upper and lower edges of the article. In a similar but distinguishable vein, the method may hold the ends of the web together with a connector having a dimension extending substantially perpendicular to the top and the bottom of the web greater than the distance between the article's upper and lower edges.

Also, the connector, when used in the method, may have a dimension extending substantially perpendicular to the top and bottom of the web greater than the distance between the top and the bottom of the web. In this instance, the first and second ends are releasably held towards each other with the connector extending beyond the web's top and bottom.

In particular, the connector may have first and second flexible metal rods affixed to the web in proximity to the first and second ends, respectively. The first rod has first upper and lower ends free from the web while the second rod has second upper and lower ends also free from the web. The first rod's first upper and lower ends are engageable with the second rod's second upper end and lower ends, respectively, to prevent the first and second upper and lower ends from moving beyond first and second predetermined distances, respectively from each other. The method then pulls the first and second upper ends towards each other and the first and second lower ends towards each other to stretch the web around the article and engages the first and second upper ends with each other and the first and second lower ends with each other. This serves to maintain the web around the article in a stretched condition with the web forcing the sheet toward the article and the sheet into contact with the article.

Using rods of the type discussed just above, the method may make use of a wrap having a web not necessarily composed of two or more layers of elastomeric material. The wrap may then include two sections of fabric adhered to the ends of the web. With the ends then wrapped around the rod connectors, the fabric pieces sit between rods and the web. The ends of the web then attach to the rest of the web to retain the connectors in place. An adhesive may well suffice to keep the fabric sections attached to the web. Where a more secure connection is desired, the fabric sections may be stitched to the web. Further, the ends of the web, after surrounding the rod connectors, may be stitched to the remaining portion of the web to keep the attachments more reliable, if desired. The stitching, of course, proves invasive of the continuity of the elastomeric material of the web. The penetrations could expand through the web except that the fabric retards or even prevents such tearing.

Alternately, the method may make use of a web, which, relative to the connector, has its first and second ends both extending from the middle of the web to beyond the connector. In other words, the ends of the web remain free beyond the location of where the connector attaches to the web. In this case, the first and second ends of the web are pulled towards each other with sufficient force to place the web under an extension force to stretch the web around the article and to maintain the web around the article in a stretched condition. Even so, the first and second ends of the web extend beyond the connector and towards each other.

Making a wrap for holding a sheet with a transferable image against an article having upper and lower edges for transferring an image from the sheet to the article includes first affixing a first component of a flexible connector in proximity to one end of an elastomeric, flexible web of material having first and second ends, a top and a bottom, the top and the bottom extending between the first and second ends. The one end of the web with the first component of the connector affixed should remain flexible.

The method then involves affixing a second component of a flexible connector in proximity to the other end of the web. The other end of the web with the second component of the connector affixed also remains flexible.

As a separate aspect, the method of making the wrap may include affixing a first component of a flexible connector by noninvasive adhering of at least a first portion of the web to itself. Then, a second component of a flexible connector is affixed in proximity to the other end of the web by noninvasive adhering of at least a second portion of the web to itself. The noninvasive adhering, such as through gluing, reduces or even eliminates a source of failure of the web in use.

As a further possibility, the method may adhere first and second sections of fabric near the ends of an elastomeric web. First and second components of a flexible connector are then adhered to the web by wrapping at least portions of the first and second ends of the web around the first and second components of the connector and adhering theses portions of ends to the web. The first and second sections of the fabric sit around the first and second connector components, respectively.

Alternately, the method may affix a first component of a flexible connector in proximity to one end of the web. This first component of the connector has a first dimension extending substantially perpendicular to the top and the bottom of the web and is greater than the distance between the web's top and bottom. Then, in proximity to the other end of the web, a second component of a flexible connector is affixed. The second component of the connector has a second dimension extending substantially perpendicular to the top and the bottom of the web. Similar to that for the first component, the second component's second dimension is greater than the distance between the web's top and bottom.

Aside from the above, the method of making a wrap may proceed by first affixing, in proximity to one end of the web, a first component of a flexible connector with at least a first portion of the web extending beyond the first component of the connector. Then, in proximity to the other end of the web, a second component of the flexible connector is affixed with at least a second portion of the web extending beyond the second component of the connector. This process leaves the web ends free for the benefits set forth above.

BRIEF DESCRIPTION OF THE FIGURES

FIG. 1 shows a mug which will undergo sublimation printing to receive the image of the words "HAPPY BIRTHDAY" along with a mug wrap which will place a sheet having a transferable image in intimate contact with the mug.

FIG. 2 illustrates the mug of FIG. 1 after it has received the sublimated image of "HAPPY BIRTHDAY" on its convex outer surface.

FIG. 3 gives a partial top plan view of the mug wrap of FIG. 1 showing its two layers of glued-together elastomer.

FIG. 4 places the mug, mug wrap, and transfer sheet with the ink of FIGS. 1 and 3 in alignment for the secure attachment of the sheet to the mug for sublimation printing.

FIG. 5 illustrates the steps followed to attach the web and thus the transfer sheet securely to the mug for sublimation printing.

FIG. 6 places the mug of the prior figures with the securely attached transfer sheet in an oven for sublimation printing.

FIG. 10 gives an alternate wrap which requires only a single motion to attach the wrap's two ends together.

FIG. 11 provides a partial top plan view along the line 11-11 of the modified mug wrap of FIG. 10.

FIG. 12 illustrates a modified wrap that may find use on a low, wide article such as a pet-food bowl.

FIG. 13 shows the modified wrap of FIG. 12 in place on a pet bowl for printing by sublimation of the image of the word "FIDO" upon the bowl.

FIG. 14 depicts, in exploded, isometric view and before final assembly, a wrap having a single layer of rubber but reinforced at its ends by a fabric web glued to the rubber layer.

FIG. 15 shows a partial isometric view from the top left of the wrap of FIG. 14 but after final assembly achieved by gluing the ends of the wrap around a retaining rod.

FIG. 16 provides a cross-sectional view along the line 16-16 of the assembled mug wrap of FIG. 15.

FIG. 17 gives an exploded, isometric view of a mug wrap just prior to final construction very similar to that of FIG. 14 but with a different retaining rod and in which the fabric is sewn to the rubber layer as well being glued to it.

FIG. 18 shows an exploded, cross-sectional view along the line 18-18 of the wrap of FIG. 17 with the fabric sewn and glue to the rubber layer.

FIG. 19 depicts, in isometric view, one end of the mug wrap of FIGS. 17 and 18 after final assembly by gluing and sewing.

FIG. 20 provides a cross-sectional view along the line 20-20 of the end of the assembled mug wrap of FIG. 19.

DETAILED DESCRIPTION

Figure 7:
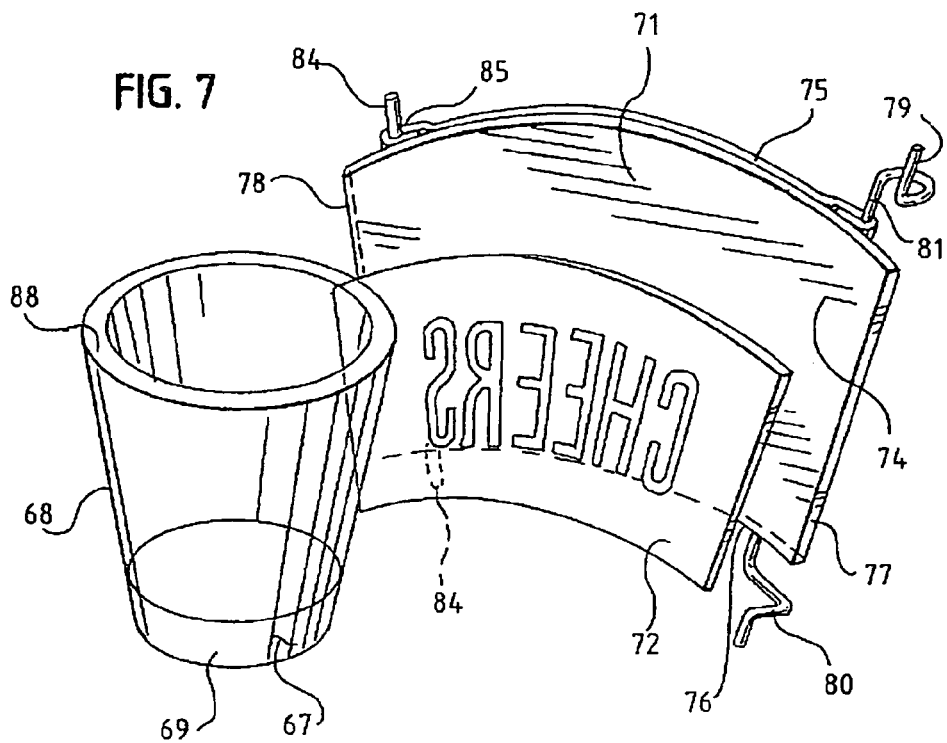
FIG. 7 shows a shot glass with a conical outer surface about to receive a transfer sheet with a holding wrap for sublimation printing.

FIG. 1 shows the blank mug generally at 21 that will receive the image on it of the words "HAPPY BIRTHDAY" from the transfer sheet 22 to produce the item in FIG. 2. As discussed above, the actual image from the sheet 22 may include anything that a computer can cause the usual printer to put on paper. Thus, the image can incorporate clip art, drawings, photographs, or a combination of these in addition to verbiage. When desiring to maintain the original right-left orientation, the computer should direct its printer to create a mirror image of the final product due to the left-right reversal that takes place during the transfer process described below. The sheet 23 itself may at times provide a superior result if it is moistened prior to its application to the item.

To permit the transfer process to take place, the wrap 24, seen in FIGS. 1 and 3 to 6, holds the transfer sheet 22 firmly in place against the mug 21. The wrap includes the flexible, elastomeric web 25 that allows for its stretching and subsequent contraction back to its original shape. As discussed below, this elastomeric property allows the wrap 24 to tightly hold the transfer sheet 22 against the mug 21 for the creation of an accurate image on the mug's surface.

In particular, the web 25, as seen most clearly in FIG. 3, includes the thicker inner layer 26 adhered to the thinner outer layer 27. Not surprisingly, the two layers 26 and 27 have different compositions and functions.

Thus, the inner layer 26 has a soft spongy texture, with a closed-cell, sponge rubber composition which serves to tightly conform the transfer sheet 22 to the mug 21. MTI Groendyk, Inc., of Buchanan, Va., provides a suitable material for this purpose under the part number 7104, which has a density of 31 pounds per cubic foot and a durometer-compression-deflection test at 25 percent of 2 to 5 pounds per square inch (as measured on a one-half inch slab). This material also exhibits an elongation of 250 percent and a 100 pounds per square inch (p.s.i.) tensile strength. Naturally, it must withstand the heat used in the image transfer process. Since sublimation printing may typically occur at 400 degrees F., the material should be able to withstand temperatures up to about 450 degrees F. The layer 26 in the figures may usefully have a thickness of about 3/16 inch or greater.

Used alone, the soft, spongy inner layer 26 lacks substantial structural integrity. It may suffer destruction under the forces used to apply and hold it to the mug. Accordingly, the wrap 24 makes use of the tough outer layer of rubber 27. In comparison to the spongy, inner layer 27, the outer layer has a tensile strength of 1000 p.s.i. It can under go a nondestructive elongation of 500 percent and return to its original shape. The layer 27 has a solid, dense silicone rubber composition and is sold by the MTI Groendyk, Inc., as part 8305. Obviously, it too can withstand the temperatures involved in heat-printing process. In the wrap 24 shown in the figures, the outer layer has a thickness of about 1/16 inch.

Naturally, the two layers 26 and 27 should adhere to each other. To enable this, use may be made of RTV 736 high-temperature-resistant silicone adhesive sold by the Dow-Corning Corp. of Midland, Mich.

The wrap 24, of course, must have some type of connector to keep it in place on the mug or other article. In FIGS. 1 and 3 to 6, the flexible rods 33 and 34, attached near the ends 35 and 36, respectively, of the web 25 serve this purpose. The rod 34 has the dog legged ends 39 and 40 which can engage with the straight ends 43 and 44, respectively, of the straight rod 33. As seen most clearly in FIG. 5, after the wrap 24 is placed around the mug 21 with the transfer sheet 22 between them, the curved end 39 of the rod 34 is pushed over the end 43 of the other rod 33. The effort to connect the two ends 39 and 43 somewhat stretches the elastomeric web 25. A similar effort connects the curved end 40 with the straight end 44 at the top of the mug 21 in FIG. 5. Accomplishing this second connecting further stretches the web 25 of the wrap 24.

Stretching the wrap 24 around the mug 21 and attaching the rod ends 39 and 43 and the ends 40 and 44 forces the transfer sheet 22 into contact with the mug 21. The structure of the wrap 24 assists in this effort in several different ways. As discussed above, The softer inner layer 26 and stronger outer layer 27 serve to effectively restrain the transfer sheer 22 against the mug 21. But the construction of the wrap 24 provides several additional advantages. First, the rods 33 and 34 extend beyond the top 47 and bottom 48 of the elastomeric web 25. This permits the operation of the connector ends 39, 40, 43 and 44 without interfering with the application of the web 25 to the mug 21.

However, the wrap has many more advantages than that. First, the rods 33 and 34 have a construction of flexible metal such as steel. This allows the application of substantial force at the top 47 and at the bottom 48 of the web 24. This makes sure that the wrap 24 applies a holding force across its entire height from its top 47 to its bottom 48. This full-height application of force is aided by the fact, recited above, that the rods 33 and 34, and especially their connectors 39, 40, 43 and 44 extend beyond the top and bottom of the web 25.

Additionally, the flexibility of the rods 33 and 34 provide a particular benefit for the mug 21. As seen in FIGS. 1, 2, and 4 to 6, the mug 21 has the curved side 51. Rigid connectors, especially straight, rigid connectors, could not follow the curved contour of the mug's side. This would result in an incomplete application of the transfer sheet 22 to the side of the mug 21. The flexible rods 33 and 34 cause the web 25 to apply pressure across its entire height.

As a further feature, the web 25 of the wrap 24 extends beyond both the top 53 and the bottom 54 of the mug 21. This permits the application of the transfer sheet 22 across the entire height of the mug 21. Thus, with an image of the appropriate height on the transfer sheet 22, the mug 21 can obtain a picture or other material that extends from its top 53 to its bottom 54.

Additionally, the combined features of the web 25 extending beyond the upper and lower edges of the mug 21, the connector rods 33 and 34 extending beyond both the top 37 and bottom 48 of the web 25, and the flexibility of the rods 33 and 34 themselves achieve a further important result. They actually cinch the upper and lower portions of the web 25 around and beyond the top 53 and the bottom 54 of the mug 21. This will serve to keep the wrap 24 from slipping vertically towards the mug's top 53 or bottom 54 when transferring the image from the sheet 22.

FIGS. 1 and 3 to 6 show further features of the wrap 24. As seen there, especially in FIGS. 1 and 3, the ends 35 and 36 of the web 24, specifically its soft inner layer 26, extend beyond the rods 33 and 34, respectively. The ends 35 and 36, as seen in FIG. 5, extend beyond the connecting rods 33 and 34 when they attach the wrap 24 to the mug 21. These extended ends 35 and 36 perform two possible but separate functions. First, they allow the wrap 24 to extend further around the mug 21 than the portion between the rods 33 and 34 themselves. This will allow the transferred image to extend around most, if not all, of the article 21. This has particular benefit for the mug 21 in FIG. 5 where the handle 57 keeps the rods 33 and 34 from meeting around the mug 51. Yet, the free ends 35 and 36 can extend further towards each other to expand the area of the mug 21 upon which the image can be placed.

Returning to FIG. 3, the end 58 of the tougher outer layer 27 of the elastomeric web 25 folds around the flexible rod 34 and attaches back upon itself. There, it is held in place by being glued to itself (and the inner layer 26). Thus, only the glue, which affixes the end of the elastomeric layer 27 back onto the web 25, holds the rod 34 to the web 25. Gluing the elastomeric end 58 to attach the rod avoids the necessity of screws, staples, or other foreign objects actually penetrating and invading the elastomeric web 25. Such penetrations, especially with the repeated stretching of the web 25 in actual use, could damage the elastomeric material. Similar remarks apply to the rod 33 at the other end 35 of the wrap 24. Gluing the rods 33 and 34 to the web 25 avoids this deleterious and undesirable destructive effect.

Additionally, sublimation and other heat-transfer ink may possibly gasify when heated. If left free to migrate, the gaseous ink could possibly rush out of the ends of the wrap under the rods 33 and 34 to create some distortion of the desired image. The free ends 35 and 36, lying against the article, or mug 21, minimize or prevent this possible distortion.

The use of the wrap 24 appears in FIGS. 4 to 6. Through the aegis of some computer and printer (or by any other method), a direct or mirror image of the desired image is placed on the transfer sheet 22. The wrap 25, transfer sheet 22, and mug 21 are then properly aligned relatively to each other as seen in FIG. 4. Then the wrap 23, with the transfer sheet 22 inside, is placed around the mug 21 as indicated by the arrows 61 and 62. After stretching the wrap 24, the crooked ends 39 and 40 of the rod 34 are placed around the straight ends 43 and 44 of the rod 33 to interconnect the rods 33 and 34.

The connection of the rods 33 and 34 keeps the wrap 24 with the transfer sheet 22 in place on the mug 21. Then the mug 21 with the transfer sheet 22 held in place is placed in the oven 63. Heating the oven 63 to the proper temperature causes the image on the sheet 22 to transfer to the mug 21. For sublimation inks, the temperature typically must rise to about 400 degrees F. or higher. The elastomeric materials of the web 25 must be able to withstand these temperatures. Having the elastomer remain intact to temperatures of around 450 degrees F. will accomplish this objective. In FIG. 1, the image of "HAPPY BIRTHDAY" has permanently transferred to the mug 21.

Figure 8:
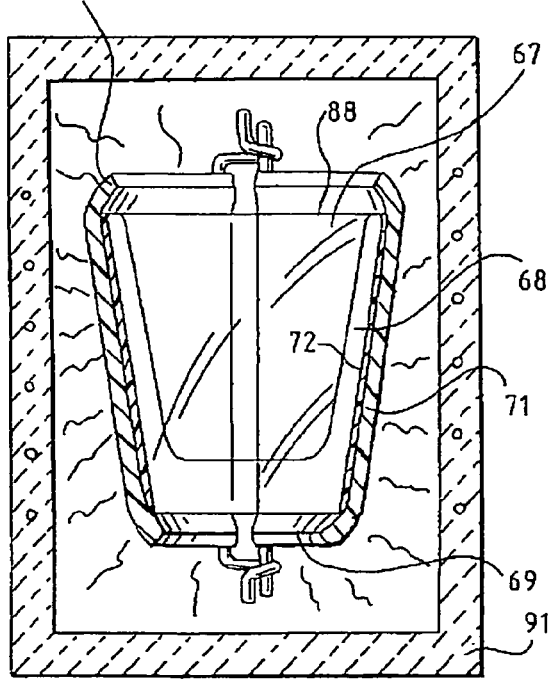
FIG. 8 provides a cross-sectional view of the shot glass of FIG. 7 within an oven and with a transfer sheet held in place by a wrap on the glass' conical or sloping side.
Figure 9:
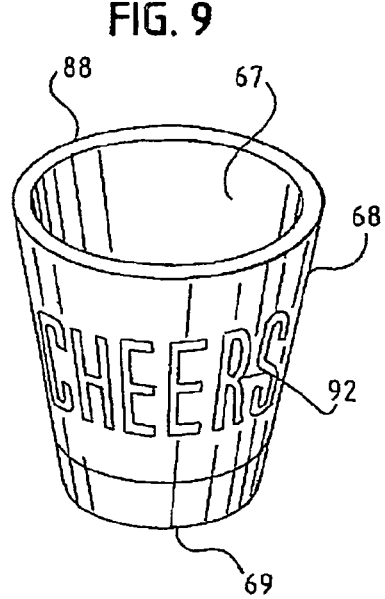
FIG. 9 portrays the shot glass of FIGS. 7 and 8 with the image sublimated onto it.

FIGS. 7 to 9 show the shot glass 67 that will receive the image of the word "CHEERS." As seen there, the glass 67 has the truncated conical, or sloping, side 68. This configuration presents the prospect of a wrap and its image-transfer sheet simply sliding toward the thinner end, or bottom 69. This could well proceed to the point that the sheet with its retaining web simply slides entirely off of the glass 67. However, the principles developed above allow the wrap 71 and the transfer sheet 72 to remain securely in place on the glass 67 through the heat-transfer process.

As seen best in FIG. 7, the wrap 71 has virtually the same structure as the mug wrap 24 of the prior figures. However, rather than assuming a rectangular configuration, the web 74 has the convex upper edge 75 and concave lower edge 76. Its two ends 77 and 78, although straight, slope downward towards each other. This allows the web 74 to closely assume the same shape as the glass 67 when wrapped around it.

Naturally, the transfer sheet 72 has a configuration similar to that of the web 74. This results in the two components consisting of the transfer sheet 72 and the web 74, when placed around the glass 67, to assume the same general, conical shape as the glass.

Using the wrap 71 proceeds in the same fashion as the mug wrap 24 of the prior figures. The wrap 71 is placed around the glass 67 with the transfer sheet 72 underneath it. The crooked ends 79 and 80 of the flexible rod 81 are engaged with the straight ends 83 and 84, respectively, of the other flexible rod 85. The serves to stretch the web 74 around the glass 67 with its upper edge 75 cinched together above the top 88 of the 67, as seen in FIG. 8. Similarly but not as critically, the web's bottom edge 76 cinches around the bottom 69 of the glass 67. With the two web edges 75 and 76, especially the former, stretched and cinched around the upper and lower edges, respectively, of the glass 67, the wrap 71 and its transfer sheet 72 will remain in place during the heat-transfer process. This occurs in the oven 91 to produce the word "CHEERS" 92 on the glass 67.

FIGS. 10 and 11 show the mug wrap 101 slightly modified to facilitate its attachment to the mug 102. As before and as indicated by the arrows 103 and 104, the wrap 101 is placed around the mug 102 with the transfer sheet 103 entrapped underneath the wrap 101 and against the mug 102. However, attaching the ends 105 and 106 of the web 107 together proceeds in a much more facile fashion. To initiate the process, the ends 105 and 106 are brought into the general vicinity of each other. At this point, the end 106 appears in phantom since it will continue to move in order to connect with the other end 105. The end 106 has the flexible rod 110, also indicated in phantom in FIG. 10, attached to it as usual.

The other end 105 has the rod 111 attached to it in the usual fashion as well. The rod 111 has the vertical section 112 attached to the web 107 through gluing as usual. The rod 111 then appears with the short vertical sections 113 and 114 rising respectively above and below the web 107. The vertical sections 113 and 114 the attach to the short horizontal sections 115 and 116, respectively, which in turn connect to the longer horizontal sections 117 and 118, respectively. The vertical rod 121 then attaches the two long horizontal sections 117 and 118 together away from the web 107.

When the two web ends 105 and 106 are brought together, the latter end 106 has the position shown in phantom seen in FIG. 10. The operator then moves the unitary rod construction consisting of the sections 112, 113, 114, 115, 116, 117, 118, and 121 into the position also shown in phantom in FIG. 11 and 12. Because all of these sections are rigidly connected to each other, this takes only one hand on the part of the operator. Then pushing the vertical rod 121 in the direction shown by the arrow 122, the horizontal rod sections 117 and 118 engage the vertical ends of the rod 110. Again, because the vertical section 121 attaches to both horizontal sections 117 and 118, this process only requires one hand of the operator and proceeds in an easy manner.

Pushing the vertical rod further in the direction of the arrow 122 causes the horizontal rod sections 117 and 118 to stretch the web 107. Moving the vertical rod 121 further will eventually move it over center and cause the ends of the rod 110 to become entrapped in the bend between the horizontal section 115 and 117 and between the sections 116 and 118. This produces the configuration shown in solid in the figures. This stable configuration then permits the heating of the mug 101, wrap 102, and transfer sheet 103 to move the image from the sheet to the mug.

Releasing the wrap 102 from the mug 101 after image transfer simply requires moving (with one hand) the vertical rod section 121 in the direction opposed to the arrow 122. This then moves the configuration seen in solid to that displayed in phantom in FIGS. 10 and 11 to remove the wrap 102 and the transfer sheet 103.

FIG. 12 show an elongated wrap 131 that assists in the transfer of an image to a low, wide article such as the pet bowl 132 seen in FIG. 13. The length L of the wrap 131 allows it to tightly circumnavigate the bowl 132, with its ends 133 and 134 held together in a fashion similar to that discussed with reference to the foregoing figures. Its height H will allow it to extend above and below the top and bottom of the bowl 132. The appropriate construction of the wrap 131 permits it to find use on bowls of parallel, curving, or sloping sides.

The wrap 131 of FIGS. 12 and 13 show a further type of connector to keep the ends together. The vertical flexible rod 135 has the two hooks 137 and 138 rigidly attached to it at locations above and below the web 140. With the web 140 stretched around the bowl 132, the hooks 137 and 138 connect with the extensions 143 and 144 of the rod 145 that extend above and below the web 140, respectively. The rods 135 and 145 attach to the web 140 in the same fashion as those shown in the prior figures. The ends 133 and 134, as before, extend beyond the location of the rods 135 and 145 as before.

The wrap indicated generally at 149 in FIGS. 14 to 16 differs from those of the prior figures by including only one layer of rubber 152 in the elastomeric web 153. While this reduces the cost and time involved in fabricating the wrap, it could possibly cause problems in the manufacture and use of the wrap 149. Thus, to force the desired intimate contact between the sheet with the sublimable image and the mug may well require a stronger force on the rubber layer 152 against the mug (with the image sheet between them). Achieving this greater force involves starting with a rubber layer 152 having a shorter distance between its ends 155 and 156. Applying the resulting wrap 149 to a mug will concomitantly stretch the rubber layer a greater distance and impose a greater force against the mug to assure intimate contact of the image sheet against it. For the typical mug, the web 153 may well have a length between its ends 155 and 156 that amounts to one-half to one inch less than the double-layered webs of the prior figures. The rubber layer 152 may be the same as the outer layer 27 of FIGS. 1 to 6 specifically and generally of the other figures as well.

The wrap 149 of FIGS. 14 to 16 then includes the sections of fabric 157 and 158 to reinforce its ends 155 and 156, respectively. The material in the sections 157 and 158 may take the form of a fabric such as the Nomex® NMX-4.5-NY product manufactured by the DuPont Company of Wilmington, Del. This material displays a strong resistance to tearing and to destruction from heat. This material may have a silicone coating on one side placed there by Mid-Mountain Material, Inc., of Mercer Island, Wash.

The adhesive 160 adheres the fabric sections 157 and 158 to the ends 155 and 156, respectively, of the web 153. The RTV 736 silicone adhesive discussed previously may find use for this purpose as well. It may also constitute the layers 161 of adhesive that hold the ends 155 and 156 to themselves after they wrap around the holding rods 163 and 164, respectively. This procedure leaves the configuration shown in FIGS. 15 and 16.

The use of the wrap 149, after the completion of its construction, proceeds in the same fashion as the prior wraps. The desired image is printed on a sheet of paper (in mirror-image form) using sublimable ink. The sheet is then placed in smooth contact with the mug or other item that will receive the image. The wrap 149 is then placed around the sheet while on the mug and stretched so that the holding rods 163 and 164 may engage each other as before. The item is then ready for heating to transfer the image.

Other than for the construction of the web 153 with its sections of fabric 157 and 158, the wrap 149 operates in exactly in the same fashion and with all of the advantages of the webs of the prior figures. In fact, the web 153, in appropriate configurations and shapes, may find use in the wraps of any of the shown figures.

The mug wrap shown generally at 169 in FIG. 17 appears very similar to the wrap 149 in FIG. 14 just before the same last stage of construction. Like the adhesive spots 160 of FIG. 14, the adhesive patches 171 and 172 hold the fabric sections 173 and 174 to the ends 175 and 176, respectively, of the single-layer elastomeric web 181. However, in addition to splotches 171 and 172 of adhesive, the lines of stitching 183 and 184 also hold the pieces of fabric 173 and 174 to the elastomeric web 181. The stitchings 183 and 184 help to hold the fabric sections 173 and 174 to the web 181 during construction and during use afterwards.

With the adhesive sections 171 and 172 and the lines of stitches 183 and 184 in place, each of the fabric sections 173 and 174 then receives the next layer of adhesive, 191 and 192, respectively. The ends 175 and 176 then wrap around their respective holding rods 193 and 194, respectively, so that the layers of adhesive 191 and 192 may contact themselves on either sides of the rods and cause the respective fabric sections 173 and 174 to fold upon and stick to themselves as shown in FIGS. 19 and 20.

To help maintain this construction, the end 171 of the web 181, when folded around the rod 193 and adhered to itself, receives the second line of stitching 197 as seen in FIGS. 19 and 20. This line of stitching 197 helps to maintain the configuration of the construction of the web end 175 shown in FIGS. 19 and 20 during the time that the adhesives 171 and 191 harden and during the subsequent use of the wrap 169. In particular, the prior webs with two or more layers of elastomeric material may also make use of the fabric sections in a fashion similar to those of FIGS. 14 to 20.

The fabric section 173 also has the benefit that it prohibits, or at least minimizes, any tearing of the elastomeric web 181 caused by the discontinuities of the holes placed through it during and for the stitching 197. In other words, without the fabric section 173, the holes around the penetrations of the stitching 197 could well expand into significant tears. The fabric section 173 stops or minimizes this deleterious effect. Although not seen in the figures, a line of stitching maintains web 181 and the fabric section 174 around the second holding rod 194. As with the wrap 149 of FIGS. 14 to 16, the wrap 169 of FIGS. 17 to 20 may assume all of the configurations and display all of the benefits of the wraps of FIGS. 1 to 13.

The holding rod 194 appears very similar to the rod 111 of FIGS. 10 and 11 and achieve the same ease of use as does the earlier rod. The rod 194 has the two vertical sections 201 and 202 and the four horizontal sections 203 to 206 as does the rod 111. In addition, though, the rod 194 has the additional two short horizontal sections 207 and 208 to keep the vertical section 202 further away from the mug or other item when in use. This extension of the vertical section 202 from the item facilitates its actual use. Otherwise, the rod 204 operates in the same fashion with the same advantages as the holding rod 111.

Figure 21:
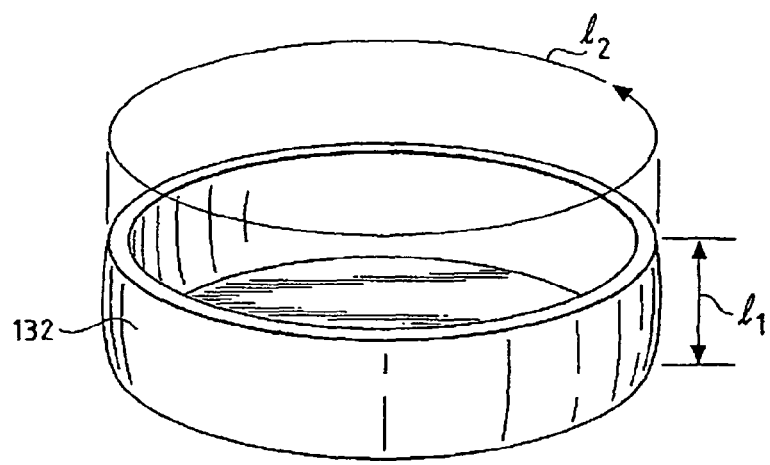
FIG. 21 shows the bowl of FIG. 13 with the dimensions $l_1$ and $l_2$ illustrated on it.
Figure 22:
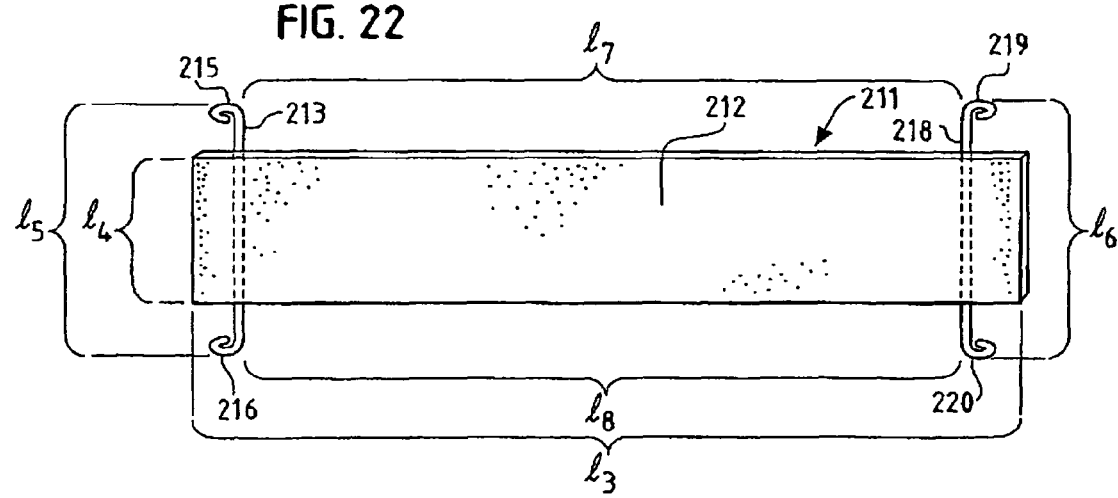
FIG. 22 displays a wrap that can find use with the bowl of FIG. 21 with the dimensions $l_3$ to $l_8$ illustrated on it.

FIG. 21 shows the bowl 132 taken from FIG. 13. The bowl 132 has the height $l_1$ and the perimeter $l_2$ circumventing the bowl 132. The wrap shown generally at 211 in FIG. 22 will serve to hold a sublimable image against the bowl 132 of the prior FIG. 21.

The wrap 211 includes the elastomeric, flexible web 212 having the length $l_3$ and the height $l_4$. The height $l_4$ of the web 212 exceeds the height $l_1$ of the bowl 132. It also includes the connector composed of its first part 213 and its second part 214 to secure the wrap 211 against the bowl 132.

Specifically, near the first end 213 of the web 212 appears the first elongate, flexible connector part 213 with its top 215 extending above the top of the web and its bottom 216 part extending below the bottom of the web 212. The second part 218 of the connector appears near the second end of the web 212. It has its top 219 and its bottom 220 extending beyond the upper and lower edges, respectively, of the web 212. As seen from this, the first connector part 213 has the height $l_5$ greater than the width $l_4$ of the web. Similarly, the second connector art 218 also has a height $l_6$ eater than the width $l_4$ of the web 212. Further, the web's length $l_3$ exceeds the separation $l_2$ between the first and second connector parts 213 and 218, respectively, above the top of the web. Similarly, the separation $l_8$ of the first and second connector parts 213 and 216, respectively, below the bottom of the web 212 is less than the web's length $l_3$ there.

Accordingly, what is claimed is:

1. A wrap for holding a sheet with a transferable image against an article having upper and lower edges for transferring an image from said sheet to said article comprising:
   A. an elastomeric, flexible web of material having first and second ends, a top and a bottom, said top and said bottom extending between said first and second ends;
   B. a connector coupled to said web in proximity to said first and second ends, said connector releasably holding said first and second ends towards each other with said top of said web towards said upper edge and said bottom of said web towards said lower edge and with said web forcing said sheet toward said article and said sheet into contact with said article, said connector placing said web under an extension force, said extension force being greater near said upper edge and said lower edge of said article than near the center between said upper and lower edges of said article, said connector comprising first and second separate elongated flexible parts, said first part having first and second extremities and said second part having third and fourth extremities, said first and second parts being attached near said first and second ends, respectively, with said first and second extremities of said first and said third and fourth extremities of second part extending beyond said top and said bottom of said web, with said first and third extremities and said second and fourth extremities being able to be releasably coupled to each other, with said first extremity of said first part being able to be releasably coupled to said third extremity of said second part and said second extremity of said first part being able to be releasably coupled to said fourth extremity of said second part, said web and said first and second parts having sufficient flexibility such that, when said first and third extremities are coupled with each other and said second and fourth extremities are coupled with each other and a force is applied to and near said first and second ends of said web and in a direction to pull said first and second ends away from each other, said first and second flexible parts will flex and upon being so pulled with said first and second parts flexing, the portions of said first and second parts lying between said respective first and second extremities of said first part and said third and fourth extremities of said second part will lie further from each other than the distances between said first and second extremities of said first part from respectively said third and fourth extremities of said second part.

2. The wrap of claim 1 wherein
   A. said first part comprises a first flexible metal rod permanently affixed to said web in proximity to said first end, said first rod having first upper and lower ends free from said web and comprising said first and second extremities, respectively; and
   B. said second part comprises a second flexible metal rod permanently affixed to said web in proximity to said second end, said second rod having second upper and lower ends free from said web and comprising said third and fourth extremities, respectively, said first upper end being able to be engaged with said second upper end and said first lower end being able to be engaged with said second lower end to prevent said first and second upper and lower ends from moving beyond first and second predetermined distances, respectively from each other.

3. A wrap for holding a sheet with a transferable image against an article having upper and lower edges separated by a first length $l_1$ and a perimeter of a second length $l_2$ circumventing said article between said upper and lower edges for transferring an image from said sheet to said article comprising:
   A. an elastomeric, flexible web of material having first and second ends separated by a distance of $l_3$, a top and a bottom, said top and said bottom extending between said first and second ends, the distance $l_4$ between said top and said bottom being greater than said first length $l_1$; and
   B. a connector having first and second elongated flexible parts coupled to said web in proximity to said first and second ends, respectively, in a direction extending from said top to said bottom of said web, said first and second parts having lengths $l_5$ and $l_6$, respectively, each longer than said distance $l_1$ between said top and said bottom of said web, the first ends of said first and second parts being separated from each other on said web by a distance $l_7$ less than $l_3$ and lying beyond said top of said web and the second ends of said first and second parts being separated by a distance $l_8$ less than $l_3$ and lying beyond said bottom of said web, said first and second parts being coupled to said web in proximity to said first and second ends, respectively, by first and second portions, respectively, of said web being glued, respectively, to themselves, said first ends of said first and second parts being engageable with each other and said second ends of said first and second parts being engageable with each other, said connector, with said web lying around said article, with said first ends of said first and second parts being engaged with each other and said second ends of said first and second parts being engaged with each other, releasably holding said web around said article with said first and second ends of said web towards each other with said top of said web extending towards and beyond said upper edge and said bottom of said web extending towards and beyond said lower edge and with said web forcing said sheet toward said article and said sheet into contact with said article, and said connector placing said web under an extension force with said first and second parts, where coupled to said web, flexing away from each other with the portions of said first and second parts lying away from said first and second ends lying at greater distances from each other than the distances separating said first ends and said second ends where coupled to each other.

4. The wrap of claim 2 wherein said web includes at least two layers of elastomeric material glued together and extending substantially the entire distance between said first and second ends.

5. The wrap of claim 4 wherein said first and flexible second metal rods, with said first and second upper ends being engaged with each other and said first and second lower ends being engaged with each other, prevent said first and second upper and lower ends from moving beyond first and second predetermined distances, respectively from each other.

6. The wrap of claim 5 wherein said first and second rods, with said first and second upper ends coupled to each other and said first and second lower ends coupled to each other and with a force applied to said web in a direction to pull said first and second ends away from each other, flex and allow portions of said first and second rods to be further from each other than other portions of said first and second rods.

7. The wrap of claim 6 wherein said first and second rods are continuously affixed to said first and second ends of said web over respective portions of said first and second ends of said web, and when portions of said first and second rods are further from each other than other portions of said first and second rods, the portions of said first and second ends of said web affixed to said portions of said first and second rods are further from each other than the portions of said first and second ends nearest to said top and bottom of said web.

8. The wrap of claim 1 wherein said first and second parts of said connector are coupled to said web in proximity to said first and second ends, respectively, by first and second portions, respectively, of said web being glued, respectively, to themselves.

9. The wrap of claim 3 wherein:
   1. said first part of said connector comprises a first flexible metal rod affixed to said web in proximity to said first end, said first rod having first upper and lower ends free from said web; and
   2. said second part of said connector comprises a second flexible metal rod affixed to said web in proximity to said second end, said second rod having second upper and lower ends free from said web, said first upper end being engageable with said second upper end and said first lower end being engageable with said second lower end to prevent said first and second upper and lower ends from moving beyond first and second predetermined distances, respectively from each other.

10. The wrap of claim 9 wherein, when said sheet is placed against said item, said wrap placed around said sheet and said item with said sheet in contact with said item and said web in contact with said sheet with the top of said web lying towards said top of said article and said bottom of said web lying toward said bottom of said article, said web forcing said sheet toward said into contact with said article, said connector having said first end of said first rod coupled to said first end of said second rod and said second end of said first rod coupled to said second end of said second rod with said top of said web lying above said top of said article and said bottom of said web lying below said bottom of said article, placing said web under an extension force, said extension force being greater near said top and said bottom of said web than at locations removed from said top and bottom of said web.

11. The wrap of claim 10 wherein said article has a relatively low, wide, generally round shape.

12. The wrap of claim 11 wherein said article is an animal bowl for food or water.

* * * * *